United States Patent
Kim et al.

(10) Patent No.: US 11,578,964 B2
(45) Date of Patent: Feb. 14, 2023

(54) OPTICAL COHERENCE TOMOGRAPHY APPARATUS AND IMAGE GENERATION METHOD USING THE SAME

(71) Applicant: KYUNGPOOK NATIONAL UNIVERSITY INDUSTRY-ACADEMIC COOPERATION FOUNDATION, Daegu (KR)

(72) Inventors: Jeehyun Kim, Daegu (KR); Pilun Kim, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 0 days.

(21) Appl. No.: 17/264,098

(22) PCT Filed: Sep. 25, 2019

(86) PCT No.: PCT/KR2019/012454
§ 371 (c)(1),
(2) Date: Jan. 28, 2021

(87) PCT Pub. No.: WO2020/080692
PCT Pub. Date: Apr. 23, 2020

(65) Prior Publication Data
US 2021/0310789 A1    Oct. 7, 2021

(30) Foreign Application Priority Data
Oct. 15, 2018  (KR) .................. 10-2018-0122442

(51) Int. Cl.
*G01B 9/02*         (2022.01)
*G01B 9/02091*      (2022.01)
(Continued)

(52) U.S. Cl.
CPC ............ *G01B 9/02091* (2013.01); *G01J 3/45* (2013.01); *G01N 21/45* (2013.01);
(Continued)

(58) Field of Classification Search
CPC ............ G01B 9/02091; G01B 9/02016; G01B 9/02027; G01B 9/02028; G01B 9/02044;
(Continued)

(56) References Cited

U.S. PATENT DOCUMENTS 8,617,470 B2 *  12/2013  Dave .................. G01N 21/45
                                              422/82.11
10,058,244 B2    8/2018  Raymond et al.
(Continued)

FOREIGN PATENT DOCUMENTS

JP    2005-516187 A    6/2005
JP    2018-521326 A    8/2018
(Continued)

OTHER PUBLICATIONS

Lin An, Peng Li, Tueng T. Shen, and Ruikang Wang, "High speed spectral domain optical coherence tomography for retinal imaging at 500,000 A-lines per second," Biomed. Opt. Express 2, 2770-2783 (Year: 2011).*

Omer P. Kocaoglu, Timothy L. Turner, Zhuolin Liu, and Donald T. Miller, "Adaptive optics optical coherence tomography at 1 MHz," Biomed. Opt. Express 5, 4186-4200 (Year: 2014).*

*Primary Examiner* — Tarifur R Chowdhury
*Assistant Examiner* — Jonathon Cook
(74) *Attorney, Agent, or Firm* — Novick, Kim & Lee PLLC; Jae Youn Kim

(57) ABSTRACT

An optical coherence tomography (OCT) apparatus includes a light source unit to generate light, a coupler unit to generate coupled light using reference light and measurement light generated by splitting the light, split the coupled light into n coupled and split lights and irradiate the n coupled and split lights, wherein n is a natural number (Continued)

greater than or equal to 2, a detection unit to irradiate the incident n coupled and split lights to n spectroscopes respectively and sequentially scan each light separated from each of the spectroscopes by wavelength range, and an image generation unit to generate a 2-dimensional single image using a result of the scanning by the detection unit. Accordingly, it is possible to improve the OCT image acquisition rate by distributing the scan time for a plurality of split lights using a plurality of array detectors.

8 Claims, 11 Drawing Sheets

(51) Int. Cl.
  *G01J 3/45* (2006.01)
  *G01N 21/45* (2006.01)
  *G01N 21/31* (2006.01)
(52) U.S. Cl.
  CPC .. *G01J 2003/452* (2013.01); *G01N 2021/317* (2013.01); *G01N 2021/3166* (2013.01)
(58) Field of Classification Search
  CPC ...... G01J 3/45; G01J 2003/452; G01N 21/45; G01N 2021/3166
  See application file for complete search history.

(56) References Cited

U.S. PATENT DOCUMENTS

| | | | |
|---|---|---|---|
| 2006/0077394 A1* | 4/2006 | Suzuki | G01J 5/0003 356/479 |
| 2006/0103850 A1* | 5/2006 | Alphonse | A61B 5/0066 356/479 |
| 2007/0015969 A1* | 1/2007 | Feldman | A61B 1/00167 600/160 |
| 2007/0278389 A1* | 12/2007 | Ajgaonkar | G01B 9/0205 250/221 |
| 2011/0279821 A1* | 11/2011 | Brennan | A61B 3/102 356/479 |
| 2015/0338202 A1* | 11/2015 | Xiang | G01B 9/02 356/477 |
| 2017/0363415 A1* | 12/2017 | Frisken | G01B 9/02032 |
| 2019/0056214 A1* | 2/2019 | Everett | A61B 3/152 |

FOREIGN PATENT DOCUMENTS

| | | |
|---|---|---|
| KR | 10-0863250 B1 | 10/2008 |
| KR | 10-1281169 B1 | 7/2013 |
| KR | 10-2014-0068346 A | 6/2014 |
| KR | 10-2018-0015890 A | 2/2018 |
| WO | 2010/006785 A1 | 1/2010 |

\* cited by examiner

OPTICAL COHERENCE TOMOGRAPHY APPARATUS AND IMAGE GENERATION METHOD USING THE SAME

TECHNICAL FIELD

The present disclosure relates to an optical coherence tomography (OCT) apparatus and an image generation method using the same, and more particularly, to an OCT apparatus with improved OCT image acquisition rate using a plurality of array detectors and an image generation method using the same.

BACKGROUND ART

A general Optical Coherence Tomography (OCT) apparatus splits light from a light source into two, and irradiates one light onto an object and the other onto a reference mirror.

Subsequently, the OCT apparatus couples measurement light reflected from the object with reference light reflected from the reference mirror. In this instance, a coherence phenomenon occurs by the coupling of the measurement light and the reference light.

That is, the conventional OCT apparatus may acquire tomography images of the object by measuring coherence signals resulting from the coupling of the measurement light and the reference light, and the tomography images may be acquired in a noninvasive, nondestructive and noncontact manner.

In this instance, the OCT apparatus may be classified into a Time Domain OCT apparatus that analyzes the coherence signals in the time domain and a Spectrum Domain OCT apparatus that analyzes the coherence signals in the spectrum domain, according to the method of measuring the coherence signals.

The Time Domain OCT apparatus acquires the tomography images of the object while mechanically adjusting the path length of the reference mirror. Accordingly, the Time Domain OCT apparatus has low stability and a low image acquisition rate.

Additionally, the Spectrum Domain OCT apparatus acquires the coherence signals in the frequency or wavelength range and extracts tomography images of the object by Fourier transform of the coherence signals.

Accordingly, the Spectrum Domain OCT apparatus has higher stability and a higher image acquisition rate than the Time Domain OCT apparatus since it does not need to mechanically move the reference mirror.

However, due to the use of a single spectroscope and the limited camera line scan rate, it is difficult to expect the image acquisition rate of a predetermined level or higher from the conventional Spectrum Domain OCT apparatus.

RELATED LITERATURES

Patent Literatures (Patent Literature 1) Korean Patent No. 10-1281169
(Patent Literature 2) U.S. Pat. No. 10,058,244 B2
(Patent Literature 3) Korean Patent No. 10-0863250

DISCLOSURE

Technical Problem

An aspect of the present disclosure provides an optical coherence tomography (OCT) apparatus that displays tomography images of a plurality of objects on a single image using a plurality of array detectors and a single reference end and exploiting a plurality of measurement lights having different frequencies due to a difference in optical path, thereby improving the OCT image acquisition rate and an image generation method using the same.

The technical problem of the present disclosure is not limited to the above-mentioned technical problem, and other technical problems not mentioned herein will be clearly understood by those having ordinary skill in the art from the following description.

Technical Solution

An optical coherence tomography apparatus according to an embodiment of the present disclosure includes a light source unit to generate light, a coupler unit to generate coupled light using reference light and measurement light generated by splitting the light from the light source unit, and split the coupled light into n coupled and split lights and irradiate the n coupled and split lights, wherein n is a natural number greater than or equal to 2, a detection unit to irradiate the incident n coupled and split lights to n spectroscopes respectively, and sequentially scan each light separated from each of the spectroscopes by wavelength range, and an image generation unit to generate a single image using a result of the scanning by the detection unit.

The detection unit may include a separation unit to convert each of the incident n coupled and split lights to parallel light, and allow each parallel light to enter the $n^{th}$ spectroscope to separate the parallel light by wavelength range, a focus unit to adjust a focal length of the parallel light separated by the separation unit by wavelength range to focus the parallel light to one focus according to each wavelength range, a scan control unit to sequentially transmit a scan start signal for starting to scan the parallel light separated from each of the first spectroscope to the $n^{th}$ spectroscope, and a scan unit to sequentially scan the parallel light focused to one focus by the focus unit according to each wavelength range when a scan start signal is received from the scan control unit.

The scan unit may scan the parallel light separated from the $n-1^{th}$ spectroscope in response to the scan start signal of the scan control unit being received, and when the scanning of the parallel light separated from the $n-1^{th}$ spectroscope is completed, the scan unit may scan the parallel light separated from the $n^{th}$ spectroscope.

The scan unit may scan the parallel light separated from the $n^{th}$ spectroscope after the scanning of the parallel light separated from the $n-1^{th}$ spectroscope is completed, when the scan start signal for the parallel light separated from the $n^{th}$ spectroscope is received from the scan control unit and the scanning of the parallel light separated from the $n-1^{th}$ spectroscope is being performed.

The coupler unit may include a reference unit to generate first light from the light of the light source unit, and scan and reflect the first light to generate reference light, a sample unit to generate second light from the light of the light source unit, and irradiate the second light onto an object and generate measurement light reflected from the object, and a splitter unit to couple the reference light and the measurement light to generate coupled light, and split the coupled light into n coupled and split lights.

When there are k objects, the sample unit may split the second light into k and irradiate onto each object, wherein k is a natural number.

The image generation unit may generate the single image with multiple channels formed according to a plurality of measurement lights having different frequencies due to a path difference of the lights irradiating the k objects, wherein k is a natural number.

The coupler unit may include a switch, and when the switch is turned on, the coupler unit may split the coupled light into coupled and split lights and irradiate the coupled and split lights.

An image generation method using an optical coherence tomography apparatus according to an embodiment of the present disclosure includes generating light, generating coupled light using reference light and measurement light generated by splitting the generated light, splitting the coupled light into n coupled and split lights and irradiating the n coupled and split lights, wherein n is a natural number greater than or equal to 2, irradiating the incident n coupled and split lights into n spectroscopes respectively to sequentially scan each light separated from each of the spectroscopes by wavelength range, and generating a single image using a result of the scanning.

Sequentially scanning each light separated by wavelength range may include converting each of the incident n coupled and split lights into parallel light, allowing each parallel light to enter the $n^{th}$ spectroscope to separate the parallel light by wavelength range, adjusting a focal length of the parallel light separated by wavelength range to focus the parallel light to one focus according to each wavelength range, sequentially transmitting a scan start signal for starting to scan the parallel light separated from each of the first spectroscope to the $n^{th}$ spectroscope, and sequentially scanning the parallel light focused to one focus according to each wavelength range when the scan start signal is received.

Sequentially scanning the parallel light may include scanning the parallel light separated from the $n-1^{th}$ spectroscope in response to the scan start signal being received, and scanning the parallel light separated from the $n^{th}$ spectroscope when the scanning of the parallel light separated from the $n-1^{th}$ spectroscope is completed.

Sequentially scanning the parallel light may include receiving the scan start signal for the parallel light separated from the $n^{th}$ spectroscope, and in case that the scanning of the parallel light separated from the $n-1^{th}$ spectroscope is being performed, scanning the parallel light separated from the $n^{th}$ spectroscope after the scanning of the parallel light separated from the $n-1^{th}$ spectroscope is completed.

Generating the coupled light may include splitting the light to generate first light and second light, scanning and reflecting the first light to generate the reference light, irradiating the second light onto the object and generating the measurement light reflected from the object, and coupling the reference light and the measurement light generated from the first light and the second light.

Generating the measurement light may include splitting the second light into k and irradiating onto each object when there are k objects, wherein k is a natural number.

Generating the single image may include generating the single image with k channels formed according to a plurality of measurement lights having different frequencies due to a path difference of the lights irradiating the k objects, wherein k is a natural number.

Splitting into the coupled and split lights and irradiating the coupled and split lights may include, when a switch provided is turned on, splitting the coupled light into coupled and split lights and irradiating the coupled and split lights.

Advantageous Effects

According to an aspect of the present disclosure, the Optical Coherence Tomography (OCT) apparatus and the image generation method using the same may improve the OCT image acquisition rate by distributing the scan time for a plurality of split lights using a plurality of array detectors.

In addition, it is possible to improve the OCT image acquisition rate by displaying tomography images of a plurality of objects on a single image using a single reference end and a plurality of measurement lights having different frequencies due to a difference in optical path.

The effects that can be obtained from the present disclosure are not limited to the above-mentioned effects, and other effects not mentioned herein will be clearly understood by those having ordinary skill in the art from the following description.

BEST MODE

Figure 1:
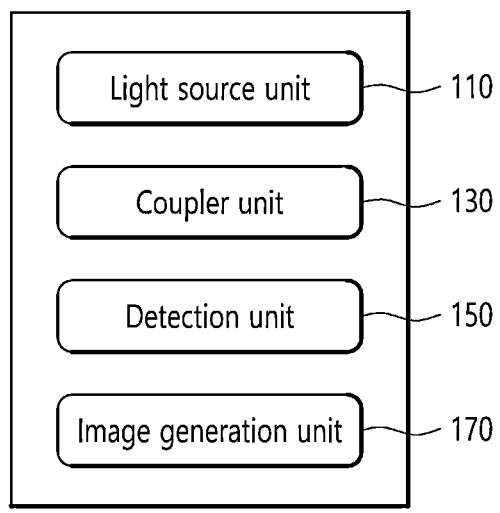
FIG. 1 is a block diagram showing an optical coherence tomography (OCT) apparatus according to an embodiment of the present disclosure.

The following detailed description of the present disclosure is made with reference to the accompanying drawings, in which particular embodiments for practicing the present disclosure are shown for illustration purposes. These embodiments are described in sufficiently detail for those having ordinary skill in the art to practice the present disclosure. It should be understood that various embodiments of the present disclosure are different but do not need to be mutually exclusive. For example, particular shapes, structures and features described herein in connection with one embodiment can be embodied in other embodiment without departing from the spirit and scope of the present disclosure. It should be further understood that changes can be made to positions or placement of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled. In the drawings, similar reference signs denote same or similar functions in many aspects.

Hereinafter, the preferred embodiments of the present disclosure will be described in more detail with reference to the accompanying drawings.

The present disclosure relates to an optical coherence tomography (OCT) apparatus for improving the OCT image acquisition rate by distributing the scan time for a plurality of split lights using a plurality of array detectors.

FIG. 1 is a block diagram showing the OCT apparatus according to an embodiment of the present disclosure.

The OCT apparatus 100 may include a light source unit 110, a coupler unit 130, a detection unit 150 and an image generation unit 170.

The light source unit 110 may generate light and transmit the light to the coupler unit 130. Here, the light may refer to a "beam" that is a stream of particles (electrons or photons) in one direction, for example, a Gaussian beam, a light beam, a laser beam, or a particle beam.

The light source unit 110 may generate white light having a wide bandwidth and a short coherence length, but is not limited thereto. For example, the light source unit 110 may generate light having the near-infrared wavelength range (800-1550 nm) with the center wavelength of 840 nm, the Full Width Half Maximum (FWHM) of 50 nm and the maximum output power of 5.3 mW.

The coupler unit 130 may refer to an optical coupler that splits one incident light into a plurality of lights or couples two incident lights to generate one light.

The coupler unit 130 may split the light generated by the light source unit 110 into first light and second light to generate reference light and measurement light, and generate coupled light using the generated reference light and the generated measurement light.

Here, when the reference light is one, the measurement light may be different depending on the number of objects. For example, when there are k (here, k is a natural number) objects, k (here, k is a natural number) measurement lights may be generated.

That is, the coupler unit 130 may form the coupled light using one reference light and k (here, k is a natural number) measurement lights, and the plurality of measurement lights split into wide frequencies may be respectively split and represented as multiple channels in a single image generated by the image generation unit 170.

Additionally, the coupler unit 130 may allow the generated coupled light to enter a device, such as a splitter, which simultaneously splits incident light into two or more, to split the coupled light into n coupled and split lights.

The detection unit 150 may transmit the n coupled and split lights incident from the coupler unit 130 to n spectroscopes, respectively, to separate by wavelength range, and the spectroscope may separate one incident coupled and split light by wavelength range.

One spectroscope may receive one coupled and split light, and separate the received coupled and split light. Accordingly, the number of lights separated by the detection unit 150 may be n in total.

The detection unit 150 may scan the coherence spectrum according to the wavelength of n incident coupled and split lights to generate an OCT single image and provide the same to the image generation unit 170.

The image generation unit 170 may generate a 2-dimensional (2D) single image using the scan result received from the detection unit 150, and generate a 3D single image using the generated 2D single image.

To generate the 3D single image, the image generation unit 170 may scan across the center of a sample to fix the center point to a specific location, and adjust a deviation induced by movement based on the detected center point.

Here, the adjustment of the center point may be performed to remove artifacts occurring when 3D radial scanning is normally performed due to the object's movement.

Additionally, the image generation unit 170 may generate a single image with k (here, k is a natural number) channels formed according to the k (here, k is a natural number) measurement lights having different frequencies due to a path difference of light that irradiates the k (here, k is a natural number) objects.

Figure 2:
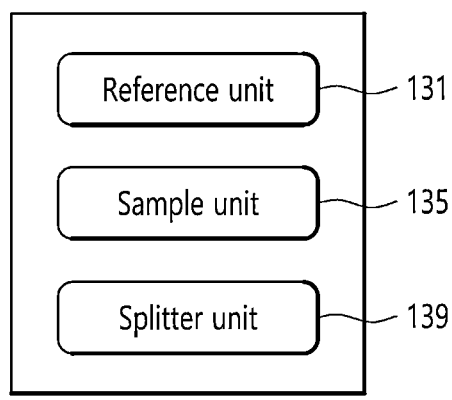
FIG. 2 is a block diagram detailing a coupler unit of FIG. 1.

FIG. 2 is a block diagram detailing the coupler unit of FIG. 1.

Referring to FIG. 2, the coupler unit 130 may include a reference unit 131, a sample unit 135 and a splitter unit 139.

The reference unit 131 may generate a first light from the light generated by the light source unit 110, and scan and reflect the generated first light to generate reference light. The generated reference light may be transmitted to the splitter unit 139.

In more detail, the reference unit 131 may include a device such as a collimator to convert the first light to parallel light, and a focusing lens to adjust the distance to focus the parallel light incident from the collimator to one focus.

Additionally, the reference unit 131 may include a reference mirror to receive the light focused to one focus through the focusing lens and reflect the light. Here, the reference mirror may change the path of the light by reflecting the incident parallel light into the device such as the focusing lens, and accordingly the reference light may be generated.

After the sample unit 135 irradiates the second light incident from the coupler unit 130 onto the object, the sample unit 135 may transmit the measurement light reflected from the object (or the internal structure of the object) to the splitter unit 139.

Here, the reflected measurement light may be generated according to the number of objects to irradiate. That is, when there are k (here, k is a natural number) objects, k (here, k is a natural number) measurement lights may be generated.

In more detail, the sample unit 135 may include a device such as a splitter to split the input second light into k (here, k is a natural number), and a device such as a collimator to convert the incident split second light to parallel light.

Additionally, the sample unit 135 may include a device such as a scanning mirror to change the optical path of the received parallel light and directly or indirectly irradiate the light onto the object, and a device such as a scan lens to adjust the light irradiated through the device such as the scanning mirror to be focused to one focus onto the object.

The sample unit 135 may include a device such as a lens adjustment device to adjust the position or angle of the scan lens. The lens adjustment device may adjust the space between the object and the scan lens by moving the device such as the scan lens by rotation or adjusting the angle in order to adjust the focus of the light.

Accordingly, the sample unit 135 may scan the light reflected from the object (or the internal structure of the object) using the device such as the scanning mirror, and acquire light information of the object (or the internal structure of the object).

For example, when the number of objects to acquire the light information is one, the sample unit 135 may allow the input second light to pass through the device such as the splitter but not to be split, and convert to parallel light through the device such as the collimator.

The converted parallel light may be irradiated onto one object from the device such as the scanning mirror, and in this instance, may be irradiated to be focused to one focus onto the object from the device such as the scan lens, and the light information of the object may be acquired by scanning the light reflected from the object irradiated with the parallel light.

In another example, when the number of objects to acquire the light information is four, the sample unit 135 may split the input second light into four lights through the device such as the splitter, and convert to parallel light through the device such as the collimator.

The converted parallel light may be irradiated onto each object from the device such as the scanning mirror and the device such as the scan lens, and in this instance, may be irradiated to be focused to one focus onto each object from the device such as the scan lens, and the light information of the object may be acquired by scanning the light reflected from the object irradiated with the parallel light.

The splitter unit 139 may couple the first light received from the reference unit 131 and the second light received from the sample unit 135 to generate coupled light, and split the generated coupled light into n (here, n is a natural number greater than or equal to 2) coupled and split lights.

In this instance, the splitter unit 139 includes a switch, and when the switch is turned on, the splitter unit 139 may split the coupled light into coupled and split lights and irradiate the coupled and split lights, and when the switch is turned off, may not split the coupled light into coupled and split lights, and may irradiate one coupled light.

Figure 3:
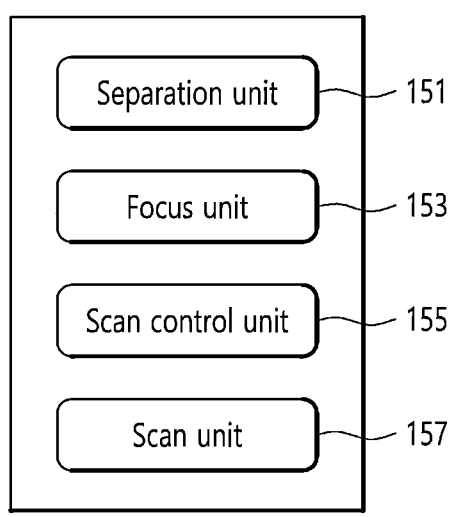
FIG. 3 is a block diagram detailing a detection unit of FIG. 1.

FIG. 3 is a block diagram showing the detection unit of FIG. 1.

Referring to FIG. 3, the detection unit 150 may include a separation unit 151, a focus unit 153, a scan control unit 155 and a scan unit 157.

The separation unit 151 may convert each of the n (here, n is a natural number greater than or equal to 2) coupled and split lights incident from the coupler unit 130 to parallel light, and allow each converted parallel light to enter the $n^{th}$ (here, n is a natural number greater than or equal to 2) spectroscope to separate by the wavelength range.

For example, when two coupled and split lights are incident from the coupler unit 130, the coupled and split lights may be converted to parallel light, and each of the two converted parallel lights may be incident into a first spectroscope and a second spectroscope.

The separation unit 151 may include a device such as a collimator to convert the coupled and split light to parallel light, and n spectroscopes to separate the parallel light by wavelength range.

The n spectroscopes of the separation unit 151 may be dedicated to the n coupled and split lights respectively, and one spectroscope may receive one coupled and split light and separate the received coupled and split light into n lights.

The focus unit 153 may adjust the focal length of the parallel light separated by wavelength range through the spectroscopes of the separation unit 151 to focus the parallel light to one focus according to each wavelength range.

The scan control unit 155 may control the scanning of the scan unit 157 that scans the parallel light separated from the separation unit 151 by wavelength range or the waiting operation for the scanning.

Among the n spectroscopes provided in the separation unit 151, when the scanning of the parallel light separated from the $n-1^{th}$ spectroscope is completed, the scan control unit 155 may transmit a scan start signal for starting to scan the parallel light separated from the $n^{th}$ spectroscope.

When the number of incident coupled and split lights is two, the scan control unit 155 may transmit a signal for scanning the parallel light separated from the first spectroscope and the parallel light separated from the second spectroscope in an alternating manner to the scan unit 157.

The scan unit 157 may sequentially scan each light separated from the n spectroscopes of the separation unit 151 using a device that can perform scanning, such as a camera. That is, the scan unit 157 may scan each light separated from the n spectroscopes at different times.

Here, the device that can perform scanning may include a CMOS camera and a CCD camera, but is not limited thereto, and may refer to a device that can scan the separated light. When the scan unit 157 receives the scan start signal from the scan control unit 155, the focus unit 153 may sequentially scan the parallel light focused to one focus according to each wavelength range.

Even though the scan start signal for the parallel light separated from the $n^{th}$ spectroscope is received from the scan control unit 155, unless the scanning of the parallel light separated from the $n-1^{th}$ spectroscope is completed, the scan unit 157 may not scan the parallel light separated from the $n^{th}$ spectroscope.

That is, even though the scan start signal for scanning the parallel light separated from the $n^{th}$ spectroscope is received, after the scanning of the parallel light separated from the $n-1^{th}$ spectroscope is completed, the scan unit 157 may scan the parallel light separated from the $n^{th}$ spectroscope.

In more detail, after the scanning of the parallel light separated from the $n-1^{th}$ spectroscope and focused to one focus is completed, when the scan start signal is received from the scan control unit 155, the scan unit 157 may start to scan the parallel light separated from the $n^{th}$ spectroscope and focused to one focus.

When the number of incident coupled and split lights is two, the scan unit 157 may receive the scan start signal of the scan control unit 155 and scan the parallel light separated from the first spectroscope and the parallel light separated from the second spectroscope in an alternating manner.

The scan unit 157 may repeat the scan operation for performing the scan by the signal received from the scan control unit 155 and the waiting operation for waiting for the scan operation.

Here, the waiting operation of the scan unit 157 may refer to an operation necessary for scanning, such as the time for pressing the shutter from the device that can perform scanning, such as the camera, and the camera excitation time.

Figure 4:
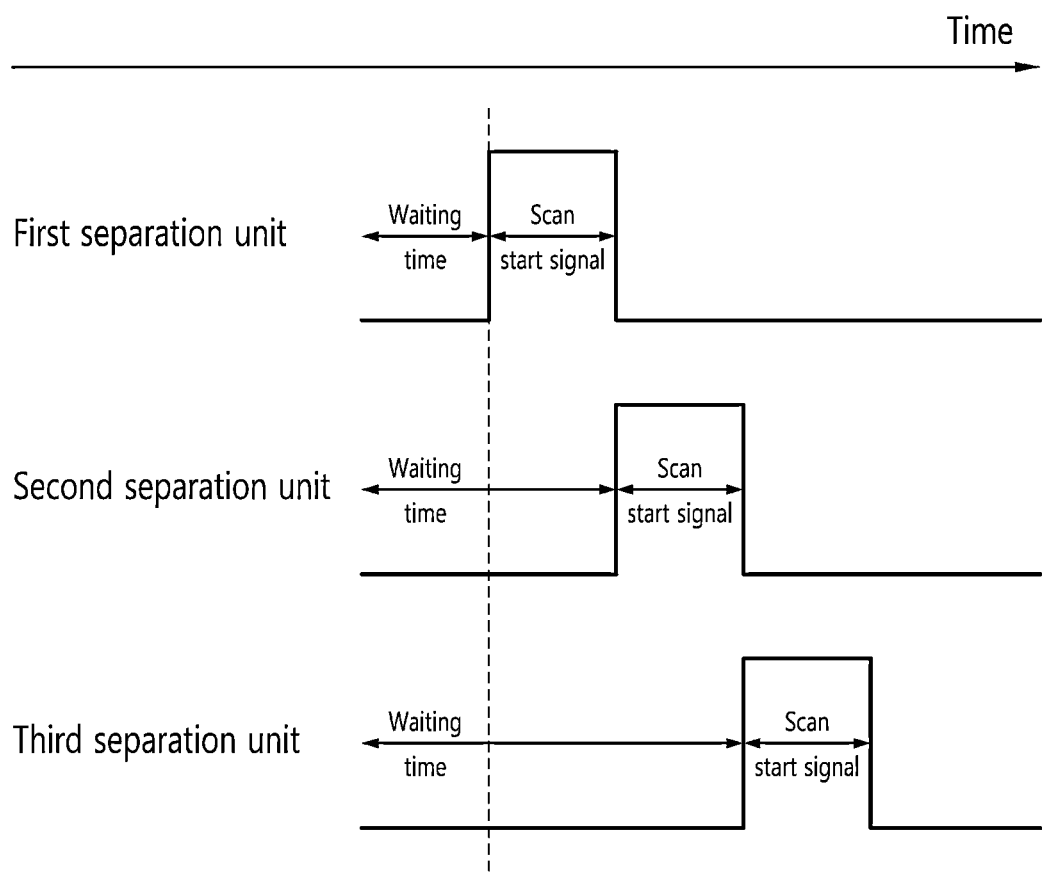
FIGS. 4 and 5 are timing diagrams showing examples of transmitting a scan start signal of a scan control unit of FIG. 3.
Figure 5:
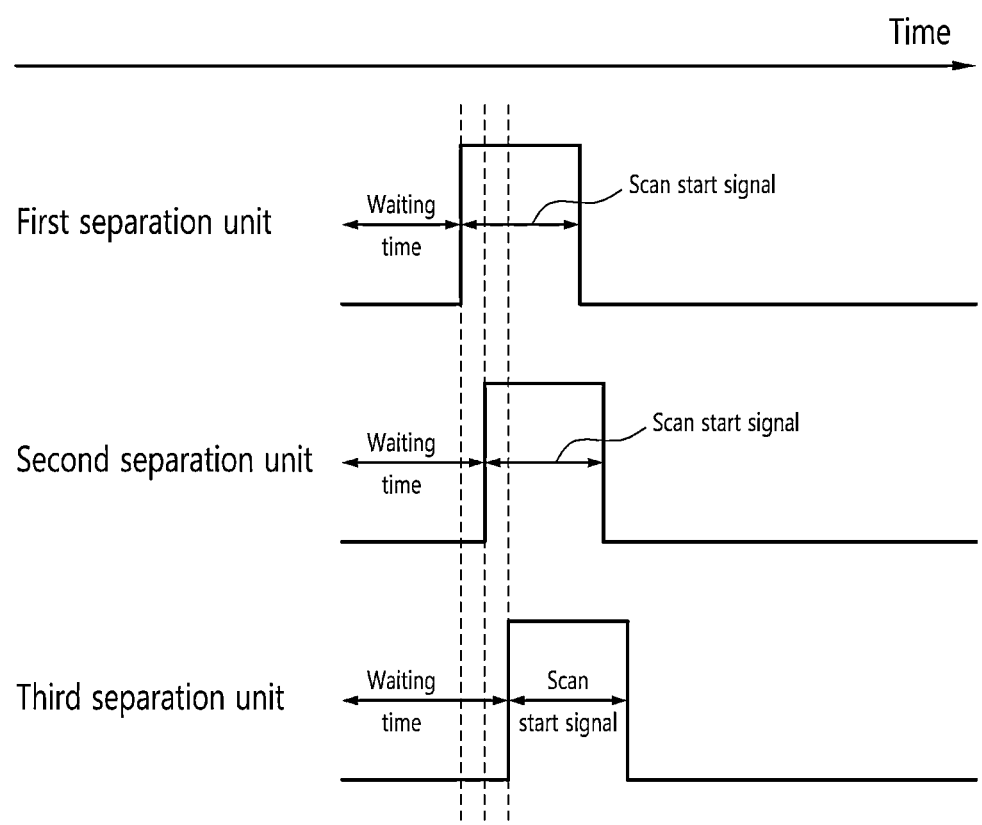
Figure 6:
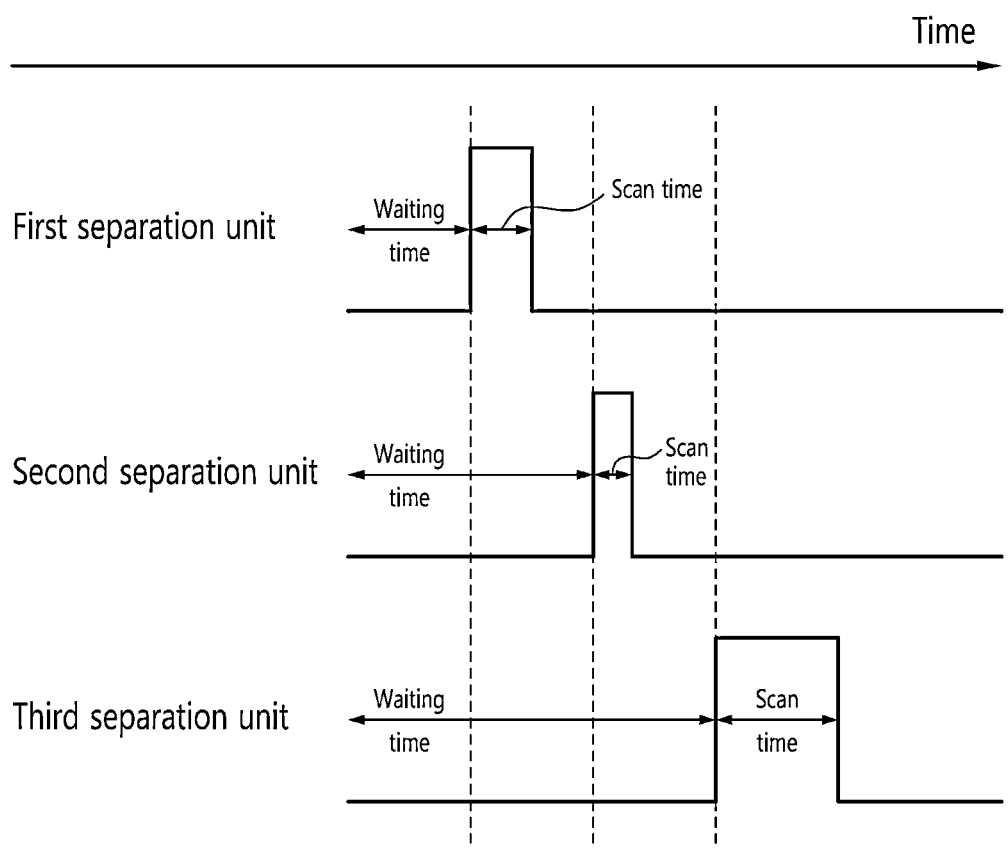
FIG. 6 are timing diagrams showing an example of performing scans after receiving the scan start signal by FIGS. 4 and 5.

FIGS. 4 to 6 are the timing diagrams showing that the OCT apparatus according to an embodiment of the present disclosure of FIG. 3 scans the coherence spectrum.

The OCT apparatus 100 according to an embodiment of the present disclosure may separate and scan one incident coupled and split light, and in this instance, may sequentially scan the separated light.

That is, the scan operation for performing the scan and the waiting operation for waiting for the scan operation may be repeatedly performed, and the scan operation for performing the scan may be performed by two methods.

First, as shown in FIG. 4, to repeat the scan operation and the waiting operation of the OCT apparatus 100, the scan start signal may be generated within a predetermined time after the scanning of the parallel light separated from the n−1$^{th}$ spectroscope is completed, and the scanning of the parallel light separated from the n$^{th}$ spectroscope may be performed.

For example, the OCT apparatus 100 provided with three spectroscopes may scan the parallel light separated from the first spectroscope by the scan start signal received from the scan control unit 155.

During the scanning of the parallel light separated from the first spectroscope, the waiting operation may be performed to scan the parallel light separated from the second spectroscope, and when the scanning of the parallel light separated from the first spectroscope is completed, the scan start signal for scanning the parallel light separated from the second spectroscope may be received.

The scanning of the parallel light separated from the second spectroscope may be performed by the scan start signal received from the scan control unit 155, and during the scanning of the parallel light separated from the second spectroscope, the waiting operation for the scanning of the parallel light separated from the third spectroscope may be performed.

When the scanning of the parallel light separated from the second spectroscope is completed, the scan start signal for scanning the parallel light separated from the third spectroscope may be received, and the scanning of the parallel light separated from the third spectroscope may be performed.

Second, as shown in FIG. 5, when the scanning of the parallel light separated from the n−1$^{th}$ spectroscope starts in response to the scan start signal for scanning the parallel light separated from the n−1$^{th}$ spectroscope, the scan start signal for scanning the parallel light separated from the n$^{th}$ spectroscope may be generated.

For example, the OCT apparatus 100 provided with n spectroscopes may scan the parallel light separated from the n−2th spectroscope by the scan start signal received from the scan control unit 155.

When the scanning of the parallel light separated from the n−2$^{th}$ spectroscope starts, the scan start signal for scanning the parallel light separated from the n−1$^{th}$ spectroscope may be generated.

That is, when scanning is performed in response to the scan start signal for scanning the parallel light separated from the n−1$^{th}$ spectroscope, the scan start signal for scanning the parallel light separated from the n$^{th}$ spectroscope may be generated.

However, even though the scan start signal for scanning the parallel light separated from the n$^{th}$ spectroscope is generated, the scanning of the parallel light separated from the n$^{th}$ spectroscope may be performed after the scanning of the parallel light separated from the n−1$^{th}$ spectroscope is completed.

The scan unit 157 may scan the parallel light by the scan start signal received from the scan control unit 155 of FIG. 4 or 5 from the Rising Edge to the Falling Edge shown in the timing diagram of FIG. 6.

The time at which the scan unit 157 scans the parallel light separated from the spectroscopes may be changed depending on the level of the separated parallel light. For example, in the case of parallel light separated with stable spectrum, short-term scanning may be performed, and in the case of parallel light separated with unstable spectrum, long-term scanning may be performed.

However, even though the scan start signal for the parallel light separated from the n$^{th}$ spectroscope is received from the scan control unit 155, unless the scanning of the parallel light separated from the n−1$^{th}$ spectroscope is completed, the scan unit 157 may not scan the parallel light separated from the n$^{th}$ spectroscope.

That is, even though the scan start signal for scanning the parallel light separated from the n$^{th}$ spectroscope is received, after the scanning of the parallel light separated from the n−1$^{th}$ spectroscope is completed, the scan unit 157 may scan the parallel light separated from the n$^{th}$ spectroscope.

The reason that the scanning of the parallel light separated from the n$^{th}$ spectroscope is performed after the scanning of the parallel light separated from the n−1$^{th}$ spectroscope is completed is to prevent an overlapping phenomenon between the parallel light separated from the n−1$^{th}$ spectroscope and the parallel light separated from the n$^{th}$ spectroscope.

Here, the time of scanning the parallel light separated from the n$^{th}$ spectroscope in response to the scan start signal for scanning the parallel light separated from the n$^{th}$ spectroscope may refer to the exposure time of the camera.

Although FIGS. 4 to 6 show that the scanning of the parallel light separated from the n$^{th}$ spectroscope is performed in response to the scan start signal generated within a predetermined time after the scanning of the parallel light separated from the n−1$^{th}$ spectroscope is completed, this is provided by way of illustration, and in practice, the generation of the scan start signal and the scan time may be set by more diverse criteria.

Hereinafter, an image generation method using the OCT apparatus 100 will be described in detail with reference to FIGS. 7 to 9.

Figure 7:
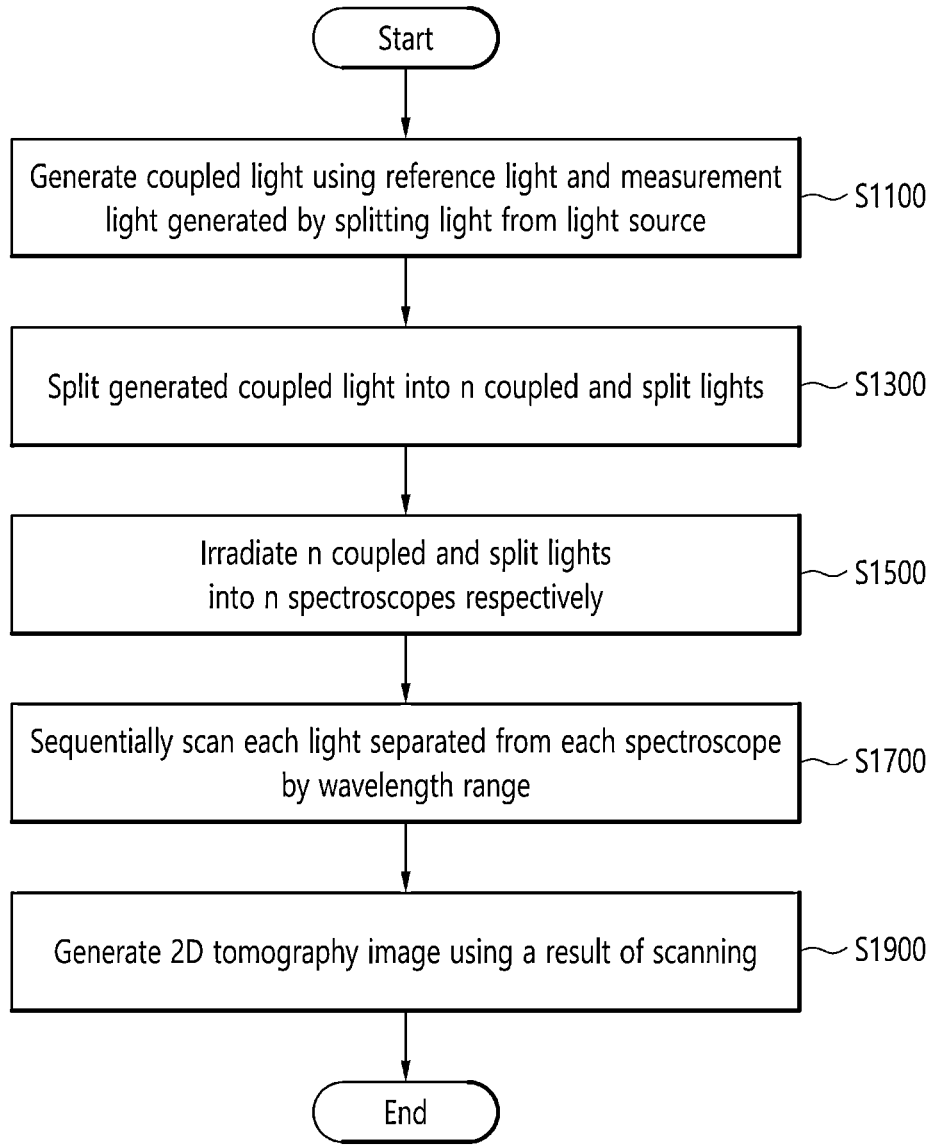
FIG. 7 is a flowchart schematically showing an image generation method using the OCT apparatus according to an embodiment of the present disclosure.

FIG. 7 is a flowchart schematically showing the image generation method using the OCT apparatus according to an embodiment of the present disclosure.

Referring to FIG. 7, the image generation method using the OCT apparatus 100 according to an embodiment of the present disclosure may include generating coupled light using reference light and measurement light generated by splitting light (S1100).

Here, when the reference light is one, the measurement light may be different depending on the number of objects. For example, when there are k (here, k is a natural number) objects, k (here, k is a natural number) measurement lights may be generated.

That is, the coupled light may be formed using one reference light and k (here, k is a natural number) measurement lights, and the plurality of measurement lights split into wide frequencies may be respectively split and represented as multiple channels in the generated single image.

The generated coupled light may be incident into the device that can simultaneously split incident light into two or more, such as the splitter, to be split into n (here, n is a natural number greater than or equal to 2) coupled and split lights (S1300).

Here, when the switch is turned on, the coupled light may be split to generate coupled and split light, and when the switch is turned off, the coupled light may not be split and the coupled and split light may not be generated.

Each of the n (here, n is a natural number greater than or equal to 2) coupled and split lights may be converted to parallel light, each parallel light may be irradiated into n (here, n is a natural number greater than or equal to 2) spectroscopes (S1500), and the parallel light may be separated from each spectroscope by wavelength range.

Sequential scanning may be performed using the device that can perform scanning such as the camera for each light separated from the n (here, n is a natural number greater than or equal to 2) spectroscopes by wavelength range (S1700).

A 2D single image may be generated using a result of scanning the parallel light separated from the n spectroscopes, and a 3D single image may be generated using the generated 2D single image (S1900).

Additionally, the single image may be generated with k (here, k is a natural number) channels formed according to k (here, k is a natural number) measurement lights having different frequencies due to a path difference of light that irradiates the k (here, k is a natural number) objects.

Figure 8:
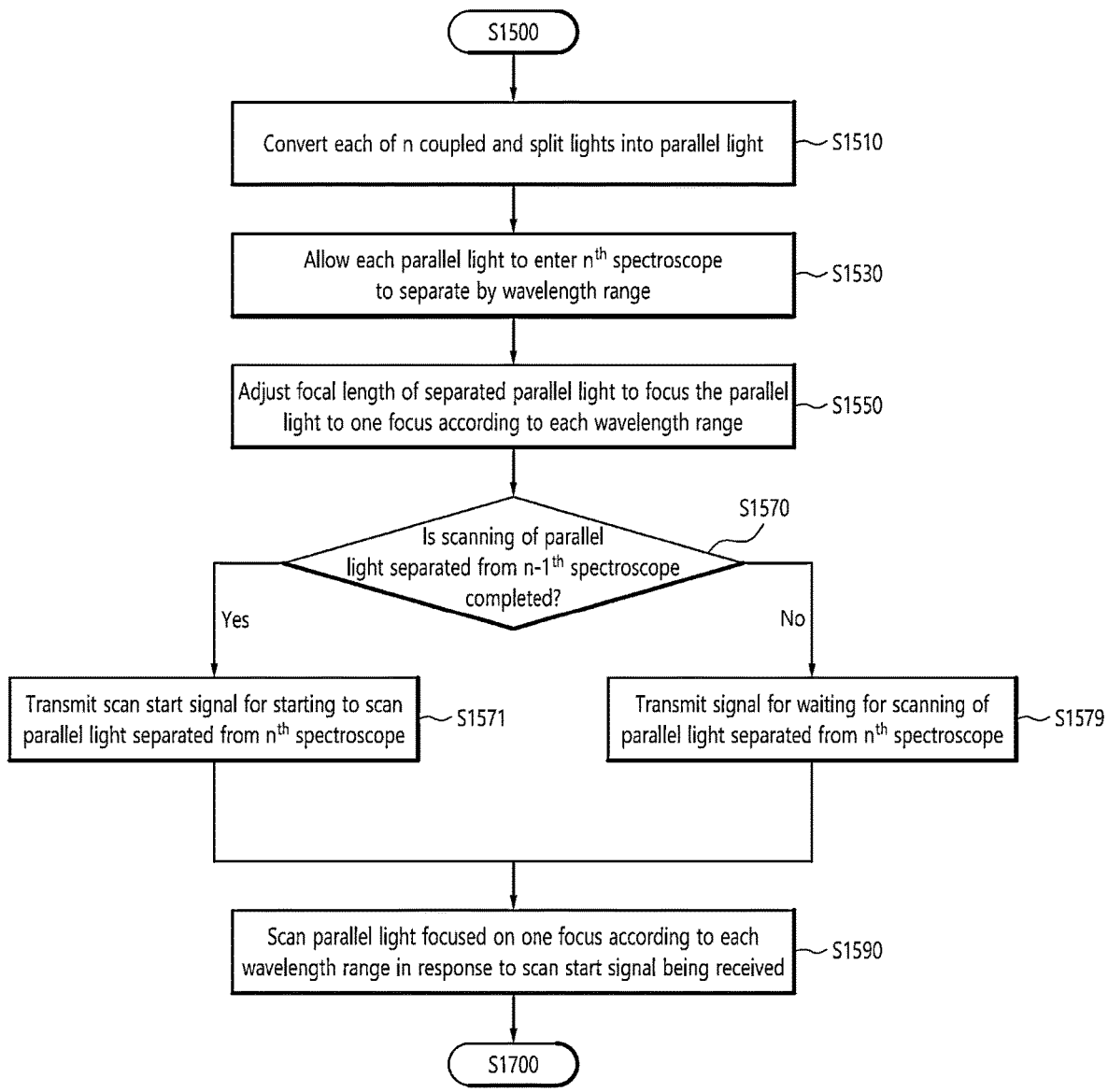
FIG. 8 is a flowchart specifically showing a method for generating the coupled light of FIG. 7.

FIG. 8 is a flowchart specifically showing a method for generating the coupled light of FIG. 7.

Light may be split to generate first light and second light (S1010). Here, the light may be white light having a wide bandwidth and a short coherence length, but is not limited thereto.

The generated first light may be incident into the device that can convert the parallel light, such as the collimator, to be converted to parallel light, and the parallel light may be incident into the device such that can adjust the distance to focus to one focus, as the focusing lens, to be focused to one focus.

The parallel light focused to one focus may be reflected using the device that can change the path of the light, such as the reference mirror, to change the path, and accordingly the reference light may be generated (S1050).

The generated second light may be incident into the device that can split into k (here, k is a natural number), such as the splitter, to be split into split second lights, and the split second light may be incident into the device that can convert to parallel light, such as the collimator, to be converted to parallel light.

The converted parallel light may be transmitted to the scanning mirror that can irradiate onto the object directly or indirectly after the optical path is changed, and the light irradiated through the device such as the scanning mirror may be focused to one focus using the scan lens that can adjust the focusing to one focus onto the object.

The scanning of the light reflected from the object (or the internal structure of the object) may be performed using the device such as the scanning mirror, light information of the object (or the internal structure of the object) may be acquired, and accordingly measurement light may be generated (S1090).

Here, the measurement light may be generated according to the number of objects to irradiate. That is, when there are k (here, k is a natural number) objects, k (here, k is a natural number) measurement lights may be generated.

Figure 9:
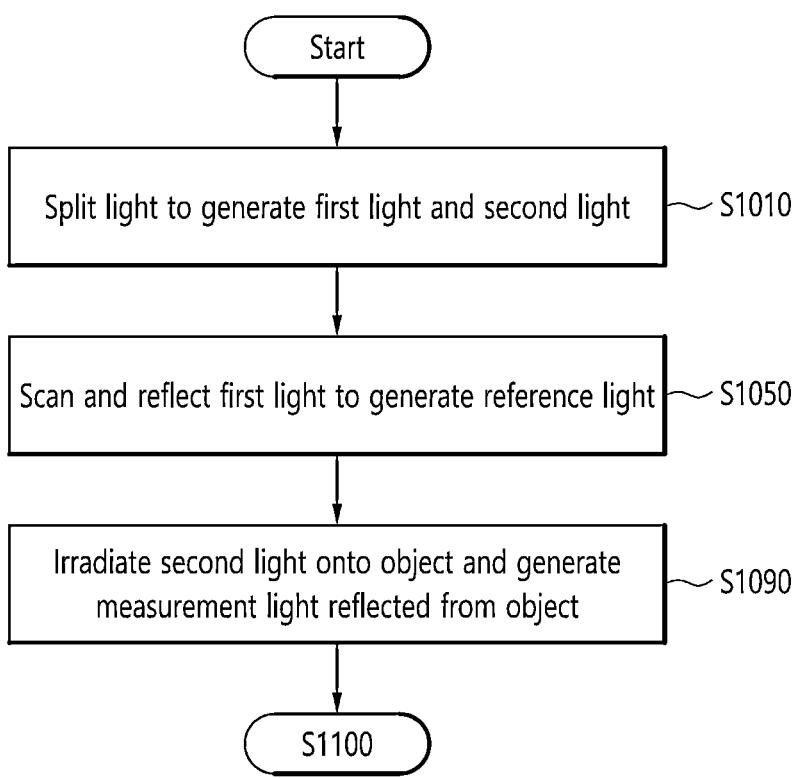
FIG. 9 is a flowchart specifically showing a method for sequentially scanning the separated light of FIG. 7.

FIG. 9 is a flowchart specifically showing a method for sequentially scanning the separated light of FIG. 7.

Each of the incident n (here, n is a natural number greater than or equal to 2) coupled and split lights may be transmitted to the device that can convert to parallel light, such as the collimator, to be converted to parallel light (S1510).

The converted parallel light may be each incident into the n spectroscopes, and the incident parallel light may be separated by wavelength range through the spectroscope (S1530). Here, one spectroscope may receive one coupled and split light, and separate the received coupled and split light into n lights.

The parallel light separated by wavelength range through the spectroscope may be focused to one focus by adjusting the focal length of the parallel light through the device that can focus to one focus according to each wavelength range, such as the focusing lens (S1550).

When the parallel light separated from the spectroscope is focused to one focus, the scanning of each separated parallel light may be performed in response to the scan start signal for scanning the parallel light separated by wavelength range.

When the scan start signal for starting to scan the parallel light separated from the $n-1^{th}$ spectroscope is received, the scanning of the parallel light separated from the $n-1^{th}$ spectroscope may be performed.

When the scanning of the parallel light separated from the $n-1^{th}$ spectroscope is completed (S1570), the scan start signal for starting to scan the parallel light separated from the $n^{th}$ spectroscope may be transmitted (S1571).

Here, even though the scan start signal for the parallel light separated from the $n^{th}$ spectroscope is received, unless the scanning of the parallel light separated from the $n-1^{th}$ spectroscope is completed, the scanning of the parallel light separated from the $n^{th}$ spectroscope may not be performed.

That is, even though the scan start signal for scanning the parallel light separated from the $n^{th}$ spectroscope is received, after the scanning of the parallel light separated from the $n-1^{th}$ spectroscope is completed, the scanning of the parallel light separated from the $n^{th}$ spectroscope may be performed.

When the scanning of the parallel light separated from the $n-1^{th}$ spectroscope is performed in response to the scan start signal for starting to scan the parallel light separated from the $n-1^{th}$ spectroscope, the waiting operation may be performed to start to scan the parallel light separated from the $n^{th}$ spectroscope.

In contrast, when the scanning of the parallel light separated from the $n-1^{th}$ spectroscope is not completed (S1570), the waiting operation for waiting for the scanning of the parallel light separated from the $n^{th}$ spectroscope may be performed (S1579).

After the scanning of the parallel light separated from the $n-1^{th}$ spectroscope is completed, when the scan start signal of the parallel light separated from the $n^{th}$ spectroscope is received, the scanning of the parallel light focused to one focus may be performed according to each wavelength range (S1590).

Figure 10:
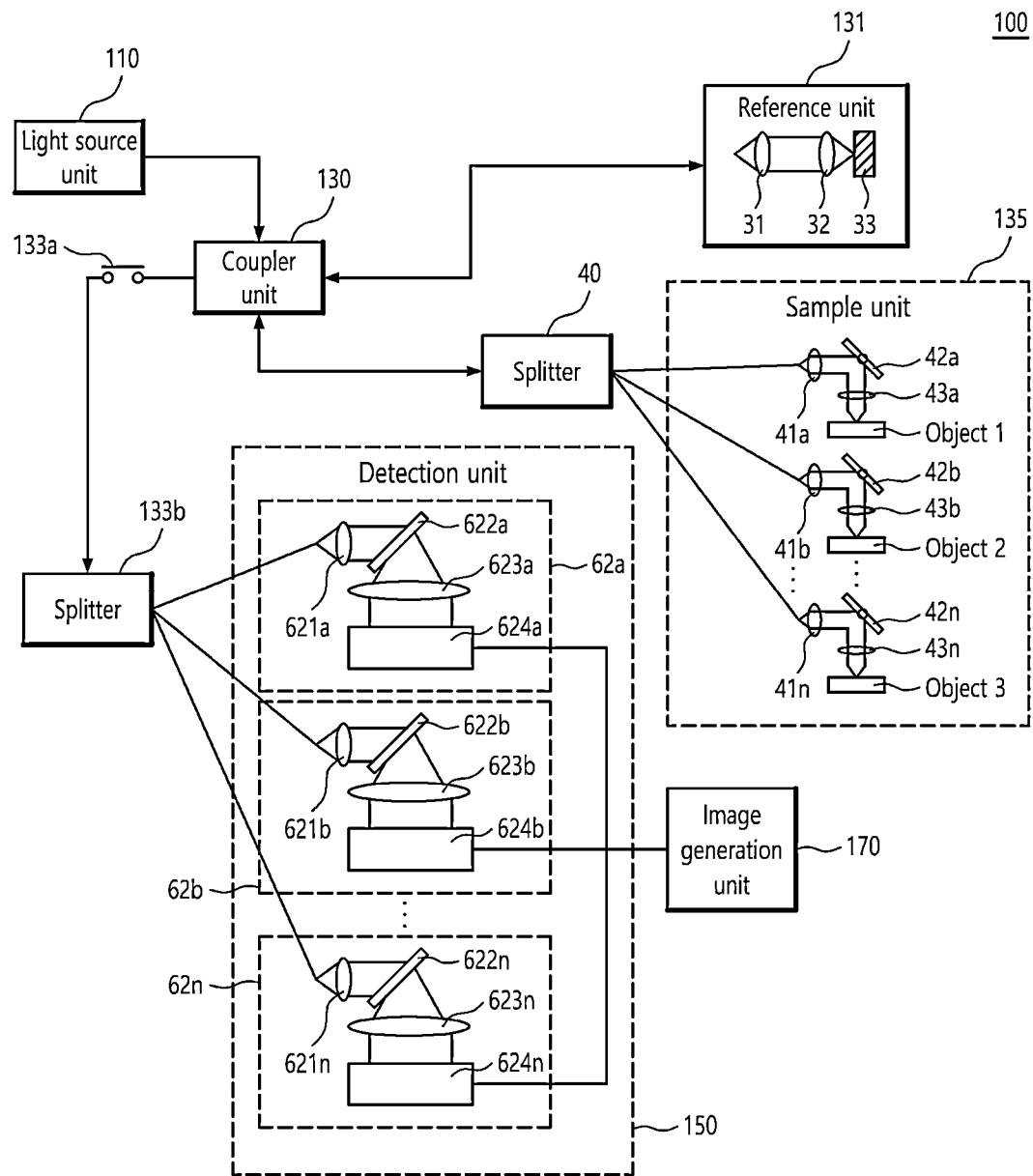
FIG. 10 is a diagram showing the flow of light when an OCT apparatus according to the present disclosure is used.

FIG. 10 is a diagram showing the flow of light when the OCT apparatus according to the present disclosure is used.

The coupler unit 130 may split the light generated by the light source unit 110 into first light and second light and transmit to the reference unit 131 and the sample unit 135, the reference unit 131 may generate reference light using the first light, and the sample unit 135 may generate measurement light using the second light.

The reference unit 131 may convert the first light to parallel light using a device 31 that can convert to parallel light, such as a collimator, and focus the parallel light incident from the collimator to one focus using a device 32 such as a focusing lens.

The light focused to one focus through the device 32 such as the focusing lens may be reflected using a device 33 that receives and reflects light, such as a reference mirror to change the path, and the light having the changed path as reference light may be transmitted to the coupler unit 130.

The sample unit 135 may split the input second light into a plurality of lights using a device that can split into m (here, m is a natural number greater than or equal to 2) such as a splitter 40, and convert the split light to parallel light using a device such as collimators 41a, 41b, . . . , 41n.

The path of the parallel light may be moved toward the object to directly or indirectly irradiate light onto the object after changing the optical path using a device such as scanning mirrors 42a, 42b, . . . , 42n, and may be adjusted to focus light to one focus of the object using a device such as scan lenses 43a, 43b, . . . , 43n.

The sample unit 135 may include a lens adjustment device to adjust the position or angle of the scan lens, and the light reflected from the object irradiated with the parallel light may be transmitted to the coupler unit 130 as measurement light.

The coupler unit 130 may couple the reference light and the measurement light received from the reference unit 131 and the sample unit 135 to generate coupled light, and the generated coupled light may be transmitted to a device that can split into m (here, m is a natural number greater than or equal to 2), such as a splitter 133b to be split into n (here, n is a natural number greater than or equal to 2) coupled and split lights.

The light split into n coupled and split lights through the device such as the splitter 133b may be transmitted to the detection unit 150. Here, when a switch 133a provided in the splitter 133b is turned on, the splitter 133b may split the coupled light into coupled and split lights. The detection unit 150 may convert to parallel light using a device such as collimators 621a, 621b, . . . , 621n to distribute the incident n (here, n is a natural number greater than or equal to 2) coupled and split lights to n spectroscopes respectively, and the converted parallel light may enter each of the n spectroscopes 622a, 622b, . . . , 622n.

The n (here, n is a natural number greater than or equal to 2) spectroscopes may be dedicated to the n coupled and split lights respectively, and one spectroscope may receive one coupled and split light, and the received coupled and split light may be separated into n lights.

The focal length of the parallel light separated by wavelength range through the n (here, n is a natural number greater than or equal to 2) spectroscopes may be adjusted to focus the parallel light to one focus according to each wavelength range using a device such as focusing lenses 623a, 623b, . . . , 623n.

The scanning of the parallel light separated from the spectroscope focused to one focus may be performed through a device that can perform scanning, such as cameras 624a, 624b, . . . , 624n, and when the scanning of the parallel light separated from each spectroscope 622a, 622b, . . . , 622n is completed, the scan result may be transmitted to the image generation unit 170 to generate a 2D single image.

Figure 11:
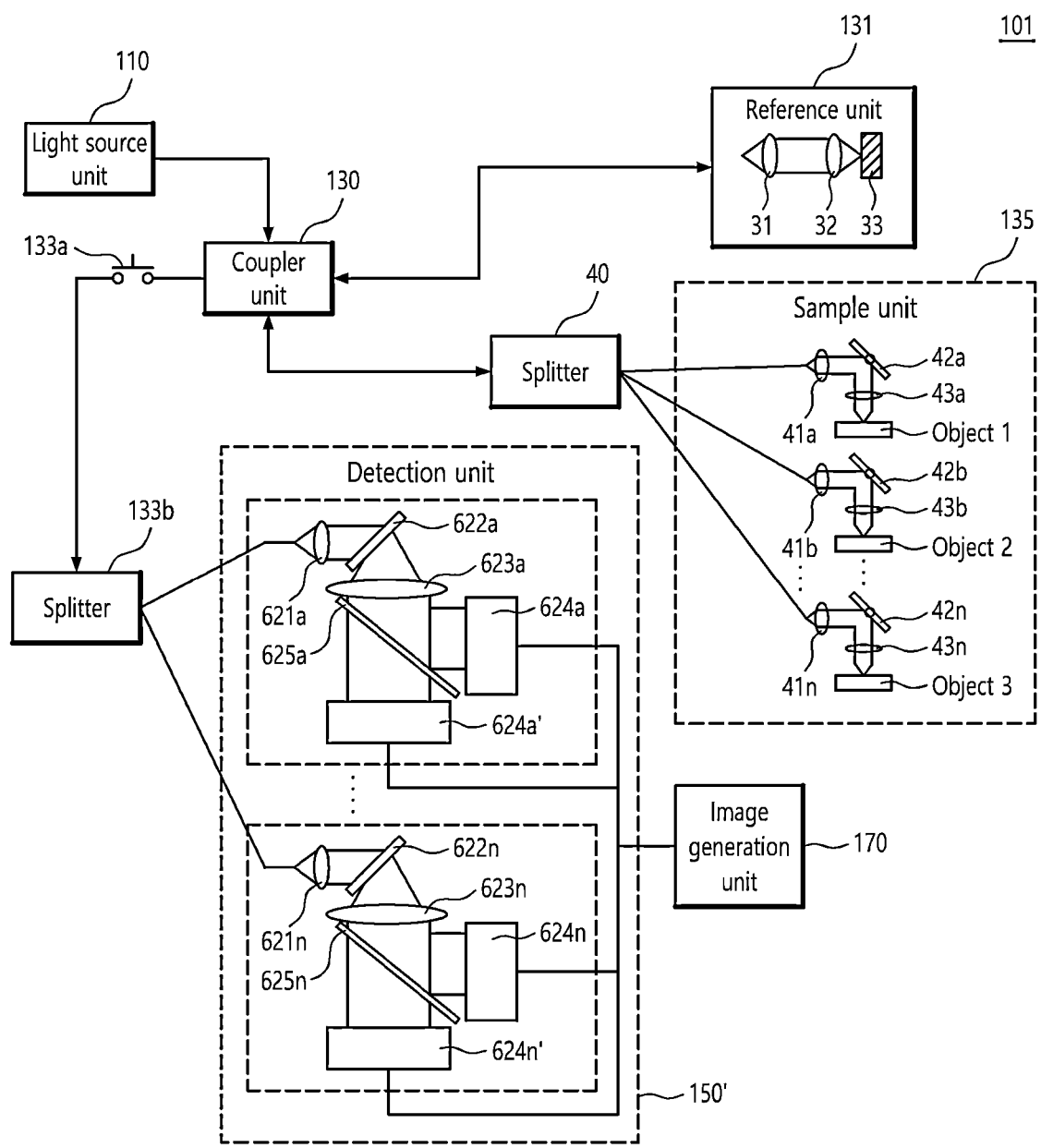
FIG. 11 is a diagram showing the flow of light when a beam splitter is added to an OCT apparatus according to the present disclosure.

FIG. 11 is a diagram showing the flow of light when a beam splitter is added to the OCT apparatus according to the present disclosure.

When a detection unit 150' of the OCT apparatus 101 according to an embodiment of the present disclosure is additionally provided with beam splitters 625a, 625b, . . . , 625n, the light separated from the spectroscope 622 and focused to one focus may be split in two directions.

The coupler unit 130 of the proposed OCT apparatus 101 may split the light generated from the light source unit 110 into first light and second light and transmit to the reference unit 131 and the sample unit 135, and the reference unit 131 may generate reference light using the first light, and the sample unit 135 may generate measurement light using the second light.

The coupler unit 130 may couple the reference light and the measurement light received from the reference unit 131 and the sample unit 135 to generate coupled light, and the generated coupled light may be transmitted to the device that can split into m (here, m is a natural number greater than or equal to 2), such as the splitter 133b, to be split into n (here, n is a natural number greater than or equal to 2) coupled and split lights.

Here, the coupler unit 130 includes the switch 133a, and only when the switch 133a is turned on, the coupled light may be split into coupled and split lights using the device such as the splitter 133b and may be irradiated.

The light split into the n coupled and split lights through the device such as the splitter 133b may be transmitted to the detection unit 150' additionally provided with the beam splitters 625a, 625b, . . . , 625n, and the detection unit 150' may convert the incident n (here, n is a natural number greater than or equal to 2) coupled and split lights to parallel light.

Here, the coupled and split light may be converted to parallel light using the device such as the collimators 621a, 621b, . . . , 621n, and the converted parallel light may be incident into each of the n spectroscopes 622a, 622b, . . . , 622n.

The n (here, n is a natural number greater than or equal to 2) spectroscopes may be dedicated to n coupled and split lights respectively, and one spectroscope may receive one coupled and split light, and split the received coupled and split light into n lights.

The focal length of the parallel light separated by wavelength range through the n (here, n is a natural number greater than or equal to 2) spectroscopes may be adjusted to focus the parallel light to one focus according to each wavelength range using the device such as the focusing lenses 623a, 623b, . . . , 623n.

The parallel light separated from the spectroscope and focused to one focus may be split in two directions through the beam splitters 625a, 625b, . . . , 625n, and the scanning of the split light may be performed through the device that can perform scanning, such as the cameras 624a, 624b, . . . , 624n.

Figure 12:
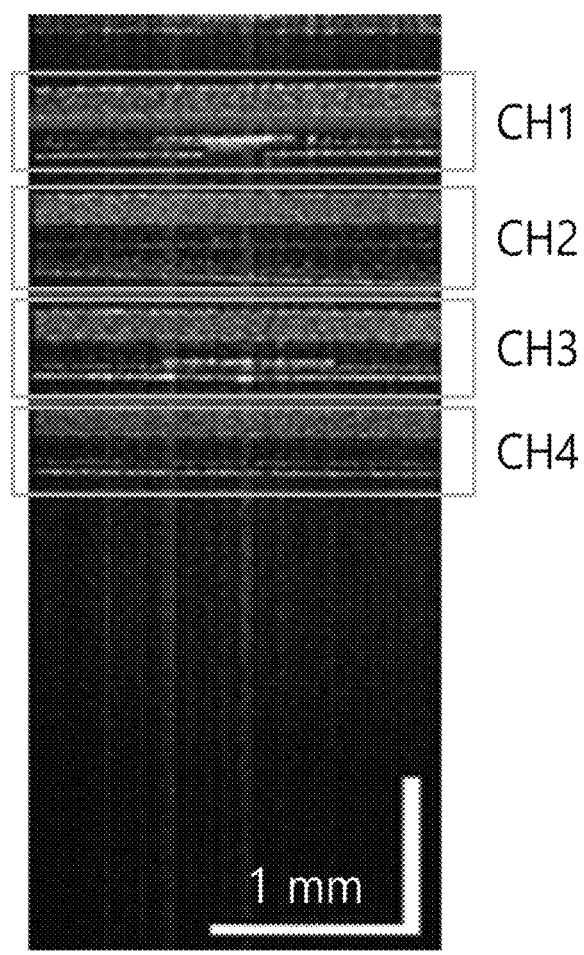
FIG. 12 is a diagram showing a two-dimensional single image generated using an OCT apparatus according to the present disclosure.

FIG. 12 is a diagram showing a 2D single image generated using the OCT apparatus according to an embodiment of the present disclosure.

Referring to FIG. 12, when the number of objects is four, an example of the generation of the 2D single image using four measurement lights having different frequencies using the OCT apparatus of the present disclosure will be described.

When the number of objects to acquire light information is four, the input second light may be split into four lights through the device such as the splitter 40, and converted to parallel lights through the device such as the collimators 41a, 41b, 41c, 41d.

The converted parallel light may be irradiated onto each object from the device such as the scanning mirror and the device such as the scan lens, and in this instance, the parallel light may be focused to one focus onto each object from the device such as the scan lens, and light information of the object may be acquired by scanning the light reflected from the object irradiated with the parallel light.

The light information acquired from the object may be transmitted to the coupler unit 130 as the measurement light, and coupled with the reference light received from the reference unit 131 to generate coupled light, and the coupled light may be split into four coupled and split lights and irradiated to the detection unit 150.

The detection unit 150 may transmit the four coupled and split lights incident from the coupler unit 130 to four spectroscopes to separate by wavelength range respectively, and the spectroscope may separate one incident coupled and split light by wavelength range.

One spectroscope may receive one coupled and split light, and separate the received coupled and split light. Accordingly, the number of lights separated by the detection unit 150 may be four in total.

The detection unit 150 may scan the coherence spectrum according to the wavelength of the four incident coupled and split lights and provide to the image generation unit 170 to generate an optical coherence single image.

The image generation unit 170 may generate a channel for each object using the scan result received from the detection unit 150 to generate a 2D single image having four channels. Accordingly, when the scanning of the parallel light separated from each spectroscope 622a, 622b, . . . , 622n is completed, the scan result may be transmitted to the image generation unit 170 to generate the 2D single image.

Although FIG. 12 shows four objects and four measurement lights generated by frequency, this is an embodiment for illustration purpose only, and the number of objects and the light split by frequency may be set by more diverse criteria.

As described above, the present disclosure may improve the OCT image acquisition rate by distributing the scan time of a plurality of split lights using a plurality of array detectors.

While the present disclosure has been hereinabove described with reference to the embodiments, it will be understood by those having ordinary skill in the corresponding technical field that various modifications and changes may be made to the present disclosure without departing from the spirit and scope of the present disclosure set forth in the appended claims.

DETAILED DESCRIPTION OF MAIN ELEMENTS

100: Optical coherence tomography apparatus
110: Light source unit
130: Coupler unit
131: Reference unit
135: Sample unit
139: Splitter unit
150: Detection unit
151: Separation unit
153: Focus unit
155: Scan control unit
157: Scan unit
170: Image generation unit

The invention claimed is:

1. An optical coherence tomography (OCT) apparatus, comprising:
a light source unit configured to generate and irradiate a light;
a coupler unit configured to
receive the light irradiated from the light source,
split the light into a first light and a second light wherein the first light is irradiated and used to generate a reference light and the second light is irradiated and used to generate a measurement light,
receive the reference light and the measurement light,
generate coupled light using the reference light and the measurement light, split the coupled light into n coupled and split lights only when a switch that is comprised within the coupler unit is turned on, and irradiate the n coupled and split lights, wherein n is a natural number greater than or equal to 2;
a detection unit configured to receive the n coupled and split lights irradiated from the coupler unit, irradiate incident n coupled and split lights to n spectroscopes, respectively, and sequentially scan each light separated from each of the n spectroscopes by wavelength range, wherein the detection unit comprises:
a separation unit configured to convert each of the incident n coupled and split lights to parallel light, and allow each parallel light to enter the $n^{th}$ spectroscope to separate the parallel light by wavelength range;
a focus unit configured to adjust a focal length of the parallel light separated by the separation unit by wavelength range to focus the parallel light to one focus according to each wavelength range;
a scan control unit configured to sequentially transmit a scan start signal for starting to scan the parallel light separated from each of the first spectroscope to the $n^{th}$ spectroscope;
a scan unit configured to sequentially scan the parallel light focused to the one focus by the focus unit according to the each wavelength range when the scan start signal is received from the scan control unit, wherein the scan start signal for the parallel light separated from the $n^{th}$ spectroscope is received from the scan control unit while the scanning of the parallel light separated from the $n-1^{th}$ spectroscope is being performed, the scan unit scans the parallel light separated from the $n^{th}$ spectroscope after the scan start signal for the parallel light separated from the $n^{th}$ spectroscope is received from the scan control unit and after the scanning of the parallel light separated from the $n-1^{th}$ spectroscope is completed; and
a beam split unit configured to split the parallel light focused by the focus unit into two beams of the parallel light, wherein the scan unit is further configured to parallelly scan the two beams of the parallel light; and
an image generation unit configured to generate a single image using a result of the scanning by the detection unit.

2. The OCT apparatus of claim 1, wherein the coupler unit comprises:
a reference unit configured to receive the first light, and scan and reflect the first light to generate the reference light;
a sample unit configured to receive the second light, and irradiate the second light onto an object and generate the measurement light reflected from the object; and
a splitter unit configured to couple the reference light and the measurement light to generate the coupled light, and split the coupled light into the n coupled and split lights.

3. The OCT apparatus of claim 2, wherein when there are k objects, the sample unit splits the second light into k and irradiates onto each object, wherein k is a natural number larger than or equal to 2.

4. The OCT apparatus of claim 3, wherein the image generation unit generates the single image with multiple channels formed according to a plurality of measurement lights having different frequencies due to a path difference of the lights irradiating the k objects.

5. An image generation method using an optical coherence tomography (OCT) apparatus, the method comprising:
generating a light;
generating a coupled light using a reference light and a measurement light generated by splitting the generated light using a coupling unit of the OCT apparatus;

receiving the coupled light;

splitting the coupled light into n coupled and split lights only when a switch that is comprised within the coupling unit is turned on, and irradiating the n coupled and split lights using the coupling unit of the OCT apparatus, wherein n is a natural number greater than or equal to 2;

irradiating the incident n coupled and split lights into n spectroscopes, respectively, and sequentially scanning each light separated from each of the n spectroscopes by wavelength range, wherein the sequentially scanning each light separated by wavelength range comprises:

converting each of the incident n coupled and split lights into parallel light, allowing each parallel light to enter the $n^{th}$ spectroscope to separate the parallel light by wavelength range, adjusting a focal length of the parallel light separated by wavelength range to focus the parallel light to one focus according to each wavelength range, sequentially transmitting a scan start signal for starting to scan the parallel light separated from each of the first spectroscope to the $n^{th}$ spectroscope, and sequentially scanning the parallel light focused to the one focus according to the each wavelength range when the scan start signal is received, wherein the scan start signal for the parallel light separated from the $n^{th}$ spectroscope is received while the scanning of the parallel light separated from the $n-1^{th}$ spectroscope is being performed, the scanning of the parallel light separated from the $n^{th}$ spectroscope starts after the scan start signal for the parallel light separated from the $n^{th}$ spectroscope is received and after the scanning of the parallel light separated from the $n-1^{th}$ spectroscope is completed; and generating a single image using a result of the scanning, wherein the sequentially scanning each light separated by wavelength range further comprises: splitting the parallel light that has been focused according to the each wavelength rage into two beams of the parallel light, and parallelly scanning the two beams of the parallel light, wherein the generating the coupled light comprises: splitting the generated light to generate first light and second light, scanning and reflecting the first light to generate the reference light, irradiating the second light onto an object and generating the measurement light reflected from the object, and coupling the reference light and the measurement light generated from the first light and the second light, and wherein the generating the measurement light comprises, when there are k objects, splitting the second light into k and irradiating onto each object, wherein k is a natural number larger or equal to 2.

6. The image generation method of claim 5, wherein the irradiating the second light onto an object and generating the measurement light reflected from the object further comprises converting the second light to a parallel light, changing the optical path of the parallel light and directly or indirectly irradiating the parallel light onto the object, and adjusting the parallel light to be focused to one focus onto the object.

7. The image generation method of claim 6, wherein the adjusting the parallel light to be focused to one focus onto the object comprises adjusting the position or angle of one or more scan lens or scan mirrors in irradiating the parallel light onto the object.

8. The image generation method of claim 5, wherein the generating the single image comprises generating the single image with k channels formed according to a plurality of measurement lights having different frequencies due to a path difference of the lights irradiating the k objects.

* * * * *